United States Patent
Itaya et al.

(10) Patent No.: US 7,937,056 B2
(45) Date of Patent: May 3, 2011

(54) VARIABLE CAPACITANCE DEVICE AND PORTABLE PHONE

(75) Inventors: Kazuhiko Itaya, Yokohama (JP);
Hiroshi Yoshida, Yokohama (JP);
Takashi Kawakubo, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 795 days.

(21) Appl. No.: 11/755,107

(22) Filed: May 30, 2007

(65) Prior Publication Data

US 2007/0281646 A1 Dec. 6, 2007

(30) Foreign Application Priority Data

May 31, 2006 (JP) .................................. 2006-152158

(51) Int. Cl.
*H04B 1/18* (2006.01)
(52) U.S. Cl. ............... 455/191.2; 455/193.3; 455/197.2; 455/290; 455/340; 310/311; 310/348; 361/277; 361/290
(58) Field of Classification Search ............. 455/191.2, 455/193.2, 193.3, 249.1, 252.1, 269, 333, 455/334, 197.2, 289, 290, 340; 310/348, 310/366; 361/277, 278, 280, 281, 290
See application file for complete search history.

(56) References Cited

U.S. PATENT DOCUMENTS

| | | | | |
|---|---|---|---|---|
| 5,894,091 | A * | 4/1999 | Kubota | 73/504.12 |
| 6,992,878 | B2 * | 1/2006 | Shimanouchi et al. | 361/280 |
| 7,215,066 | B2 * | 5/2007 | Kawakubo et al. | 310/348 |
| 7,323,805 | B2 * | 1/2008 | Sano et al. | 310/358 |
| 7,388,247 | B1 * | 6/2008 | Lagnado et al. | 257/312 |
| 7,459,827 | B2 * | 12/2008 | Kawakubo et al. | 310/309 |
| 7,471,031 | B2 * | 12/2008 | Kawakubo et al. | 310/330 |
| 7,561,010 | B2 * | 7/2009 | Hikita et al. | 333/187 |
| 2002/0059829 | A1 * | 5/2002 | Sakai | 73/504.12 |
| 2004/0150939 | A1 | 8/2004 | Huff | |
| 2005/0013087 | A1 * | 1/2005 | Wu et al. | 361/303 |
| 2005/0242687 | A1 * | 11/2005 | Kawakubo et al. | 310/324 |
| 2006/0290236 | A1 * | 12/2006 | Ikehashi | 310/330 |
| 2008/0106275 | A1 * | 5/2008 | Seppa et al. | 324/680 |

FOREIGN PATENT DOCUMENTS

| | | |
|---|---|---|
| JP | 2004006588 | 1/2004 |
| JP | 2005313276 | 11/2005 |
| JP | 2006093463 | 4/2006 |

OTHER PUBLICATIONS

Japanese Office Action dated Sep. 30, 2008 corresponding to U.S. Appl. No. 11/755,107, filed on May 30, 2007.

* cited by examiner

*Primary Examiner* — Duc M Nguyen
(74) *Attorney, Agent, or Firm* — Turocy & Watson, LLP

(57) ABSTRACT

A variable capacitance device has a piezoelectric driving part, a movable electrode, a fixed electrode, a dielectric film and a driving control unit. The piezoelectric driving part has a piezoelectric film, an upper electrode disposed on a top surface of the piezoelectric film, a lower electrode disposed on an undersurface of the piezoelectric film and electrode slits which separate the upper electrode and the lower electrode into two, respectively. The movable electrode is provided via the electrode slits at one end of the piezoelectric driving part. The fixed electrode is disposed opposite to the movable electrode via a gap. The dielectric film is disposed opposite to the movable electrode via the gap and provided on the fixed electrode. The driving control unit adjusts a distance between the movable electrode and the fixed electrode to reduce a fluctuation of a predetermined capacitance of a variable capacitor formed between the variable electrode and the fixed electrode.

12 Claims, 6 Drawing Sheets

VARIABLE CAPACITANCE DEVICE AND PORTABLE PHONE

CROSS REFERENCE TO RELATED APPLICATIONS

This application is based upon and claims the benefit of priority from the prior Japanese Patent Application No. 2006-152158, filed on May 31, 2006, the entire contents of which are incorporated herein by reference.

BACKGROUND OF THE INVENTION

1. Field of the Invention

The present invention relates to a variable capacitance device using a piezoelectric film and a portable phone including the variable capacitance device.

2. Related Art

In recent years, radio communication techniques have achieved remarkable progress and are still under development for transmitting information at higher speeds. In the market of radio communication techniques, frequency bands around 2 GHz have been widely used in response to the introduction of the Personal Handyphone System (PHS), third-generation mobile communications, wireless LANs and so on, and the number of subscribers and terminals has dramatically increased. In order to transmit information at higher speeds, higher carrier frequencies are used and the commercialization of frequency bands up to 5 GHz has been started in wireless LAN systems.

Regarding such high-frequency communications equipment, reduction of size and weight is strongly demanded. Particularly, for use in personal computers (PCs), it is highly important to fabricate communications equipment with a small thickness for use as a PC card.

Generally, wireless equipment such as a PC card is broadly divided into an RF front end unit for processing radio frequencies (RF) and a baseband (BB) unit for processing digital signals. Of these units, the BB unit modulates and demodulates signals through digital signal processing. Basically, the BB unit can be configured using an LSI chip including a Si substrate and thus the height of the BB unit can be easily reduced to about 1 mm or less.

On the other hand, the RF unit performs amplification, frequency conversion and so on while using a radio frequency signal as an analog signal. The RF unit is hard to configure only with an LSI chip, and thus the RF unit has a complicated configuration including a number of passive components such as a resistor, a capacitor, an inductor, an oscillator, and a filter.

Semiconductor parts serving as LSI chips have been widely developed mainly with the aim of achieving finer design rules. While LSI chips have been reduced in size with greater functionality, it is difficult to omit the passive components of the RF unit because each of the passive components has functions determined by specifications. Further, the passive components are hard to fabricate with semiconductors, and thus the passive components are fabricated separately from semiconductor chips and then assembled with the semiconductor chips on semiconductors or another substrate in many cases.

However, such passive components have been also miniaturized and the number of passive components has increased more and more, causing a serious problem on an assembly unit for achieving high-density packaging or a throughput of an assembly. Although the above explanation has been described as an example of wireless communications, this problem arises not only in the field of wireless communications but also in all kinds of electronic components and electronic devices.

In order to solve this problem, in recent years, considerable attention has been focused on techniques of fabricating switches and varicaps by means of actuators fabricated by a technique of Micro-electro-mechanical System (MEMS) (See U.S. Patent No. 2004/150939). Particularly, for high-frequency use including portable phones and car phones, MEMS switches achieve a low loss and high insulation during an off period as compared with conventionally used semiconductor switches and varicaps. Further, MEMS varicaps achieve a high Q value. For these reasons, the use of such MEMS switches and varicaps is regarded as promising.

A MEMS varicap includes, for example, a movable electrode which is provided on a beam of an actuator having one end supported in the air above a substrate, and a fixed electrode which is provided on a surface of the substrate facing the actuator. A capacitance between electrodes is varied by changing a distance between the movable electrode and the fixed electrode by means of the actuator.

A MEMS switch can be configured by using the structure of the MEMS varicap as it is. Alternatively, a MEMS switch can be configured by directly contacting a movable electrode and a fixed electrode with each other or causing the movable electrode and the fixed electrode to face each other via quite a thin dielectric film in a high frequency region of GHz or higher.

As a driving mechanism for a MEMS actuator, there are methods in which a beam is displaced by bending with an electrostatic force, a thermal stress, an electromagnetic force, a piezoelectric force and the like. In the case of electrostatic driving, although the power consumption is low, a high voltage of about 10 V to 100 V is required for driving an actuator. Further, in an electrostatically driven varicap, when a distance between a movable electrode and a fixed electrode exceeds one third of an original distance between the electrodes, the movable electrode is pulled in the fixed electrode, so that a rate of change in capacitance cannot be high. In thermal driving and electromagnetic driving, current passes through a resistor and an electromagnetic coil and thus power consumption increases.

On the other hand, in the case of piezoelectric driving, the power consumption is low, an operation is enabled at a driving voltage of 10 V or less, and a movable electrode is not pulled in a fixed electrode. Thus, it is possible to greatly change an actuator in a continuous manner and a rate of change in capacitance can be high. As described above, a piezoelectric driving mechanism has a number of advantages as compared with the other driving mechanisms and attracts attention as a MEMS switch and varicap.

However, since a piezoelectric driving actuator has a long and thin beam structure including a piezoelectric film interposed between upper and lower electrodes, the beam warps upward and downward due to a small residual stress of a material of the piezoelectric film or the upper and lower electrodes. Further, in the case where a switch or a varicap is formed using a part of the upper and lower electrodes of a piezoelectric actuator as a movable electrode, in order to prevent a signal transmitted from the fixed electrode to the movable electrode from passing through a piezoelectric driving power supply via the upper and lower electrodes, a slit region including no electrodes is formed between the upper and lower electrodes and the movable electrode to provide electrical isolation. The region including no electrodes on the piezoelectric film also warps due to a residual stress, as on the actuator. However, an amount of warp is different between the region and the actuator by whether the electrodes are present or not. For this reason, even when the residual stress of the piezoelectric film and the upper and lower electrodes is optimized to eliminate the warp of the actuator, a warp occurs from the boundary of the upper and lower electrodes and the movable electrode.

In order to solve this problem, it is important to reduce the residual stress of the piezoelectric film. Film-forming apparatuses have actually improved and technical development is obtained for reducing a residual stress without causing problems under operating conditions. However, variations are actually found in mass production. Thus, it is quite difficult to stably comply with a specification value required in a system specification.

Moreover, when this kind of piezoelectric driving actuator is applied to a portable phone and the like, a serious and potential problem arises as follows. When the portable phone is dropped and hit on the ground, a piezoelectric bridge is also accelerated, the operation becomes unstable, and the bridge is brought into contact with an opposing electrode and degraded. Further, portable phones have complicated structures and a space for storing the piezoelectric driving actuator is limited.

SUMMARY OF THE INVENTION

An object of the present invention is to provide a variable capacitance device which is not broken or does not have a capacitance change even when the variable capacitance device undergoes hard acceleration due to an impact and the like.

According to one embodiment of the present invention, a variable capacitance device, comprising:

a piezoelectric driving part which has a piezoelectric film, an upper electrode disposed on a top surface of the piezoelectric film, a lower electrode disposed on an undersurface of the piezoelectric film and electrode slits which separate the upper electrode and the lower electrode into two, respectively;

a movable electrode provided via the electrode slits at one end of the piezoelectric driving part;

a fixed electrode disposed opposite to the movable electrode via a gap;

a dielectric film which is disposed opposite to the movable electrode via the gap and provided on the fixed electrode; and a driving control unit which adjusts a distance between the movable electrode and the fixed electrode to reduce a fluctuation of a predetermined capacitance of a variable capacitor formed between the variable electrode and the fixed electrode.

Furthermore, according to one embodiment of the present invention, a variable capacitance device, comprising:

a variable capacitor which variably changes a capacitance by expansion and contraction of a first piezoelectric film; and an acceleration sensor which is adjacently disposed to the variable capacitor, capable of changing a capacitance by expansion and contraction of a second piezoelectric film, and detects at least one of a change in the capacitance by expansion and contraction of the second piezoelectric film per unit time and a change in the voltages at both surface of the second piezoelectric film, wherein the variable capacitor has:

a first piezoelectric driving part which has a first upper electrode and a first lower electrode disposed up and down by sandwiching the first piezoelectric film, and has first electrode slits which separate the first upper electrode and the first lower electrode into two, respectively;

a first movable electrode provided via the first electrode slits at one end of the first piezoelectric driving part;

a first fixed electrode disposed opposite to the first movable electrode via a gap by sandwiching a dielectric film; and a first driving control part which adjusts a distance between the first movable electrode and the first fixed electrode to reduce a fluctuation of a predetermined capacitance of a variable capacitor formed between the first movable electrode and the first fixed electrode, wherein the acceleration sensor has:

a second piezoelectric driving part which has a second upper electrode and a second lower electrode disposed up and down by sandwiching the second piezoelectric film, and has second electrode slits which separate the second upper electrode and the second lower electrode into two, respectively;

a second movable electrode provided via the electrode slits at one end of the second piezoelectric driving part;

a second fixed electrode disposed opposite to the second movable electrode via a gap by sandwiching a dielectric film; and a second driving control part which adjusts a distance between the second movable electrode and the second fixed electrode to reduce a fluctuation of a predetermined capacitance of a variable capacitor formed between the second movable electrode and the second fixed electrode.

DETAILED DESCRIPTION OF THE INVENTION

An embodiment of the present invention will now be described below in accordance with the accompanying drawings.

First Embodiment

Figure 1:
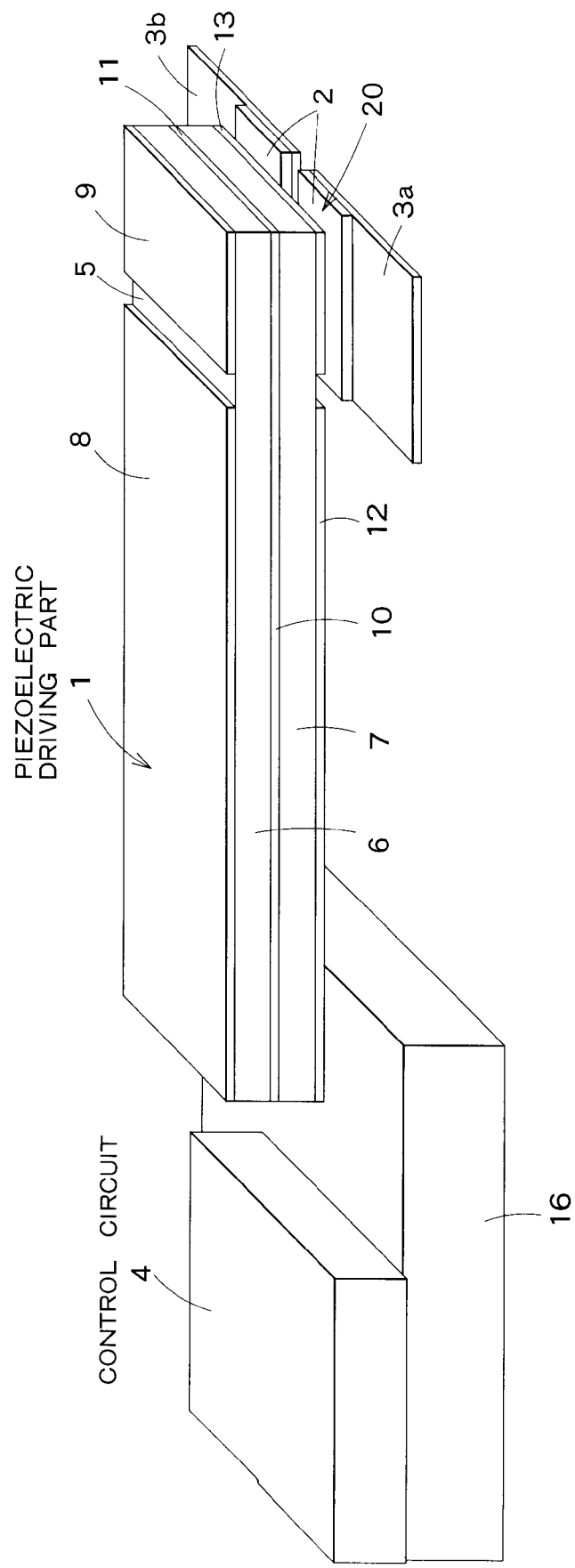
FIG. 1 shows the overall structure of a variable capacitance device according to First Embodiment of the present invention.

FIG. 1 shows the overall structure of a variable capacitance device according to First Embodiment of the present invention. The variable capacitance device of FIG. 1 includes a piezoelectric driving part 1 of a MEMS structure having one fixed end and the other end movable up and down in response to the expansion and contraction of a piezoelectric film, fixed electrodes 3a and 3b opposed to each other at the other end of the piezoelectric driving part 1 by sandwiching dielectric films 2 and a control circuit (driving control unit) 4 for controlling the driving of the piezoelectric driving part 1.

The fixed electrodes 3a and 3b and the control circuit 4 are disposed on the same substrate (not shown) or different substrates (not shown). These substrates are made of, for example, silicon, quartz, and the like. The fixed electrodes 3a and 3b are separately disposed in a direction different from the longitudinal direction of the piezoelectric driving part 1, and the corresponding dielectric films 2 are disposed on the fixed electrodes 3a and 3b, respectively.

The piezoelectric driving part 1 has a MEMS structure including first and second piezoelectric films 6 and 7 which expand and contract in opposite directions. On the top surface of the first piezoelectric film 6, first and second upper electrodes 8 and 9 separately disposed in the longitudinal direction are connected. On the undersurface of the first piezoelectric film 6 and the top surface of the first piezoelectric film 7, first and second intermediate electrodes 10 and 11 separately disposed in the longitudinal direction are connected. On the undersurface of the second piezoelectric film 7, first and second lower electrodes 12 and 13 separately disposed in the longitudinal direction are connected.

The first upper electrode 8, the first intermediate electrode 10, and the first lower electrode 12 are disposed to face one another in a vertical direction to make up a first movable electrode pair. Similarly, the second upper electrode 9, the second intermediate electrode 11, and the second lower electrode 13 are disposed to face one another in the vertical direction to make up a second movable electrode pair.

When voltages are applied to the first upper electrode 8 and the first intermediate electrode 10, the first piezoelectric film 6 expands and contracts with distortion due to an inverse piezoelectric effect. Similarly, when voltages are applied to the first intermediate electrode 10 and the first lower electrode 12, the first piezoelectric film 7 expands and contracts with distortion due to the inverse piezoelectric effect. For example, when the first intermediate electrode 10 is higher in potential than the first upper electrode 8 and the first lower electrode 12, the first piezoelectric film 6 expands and the second piezoelectric film 7 conversely contracts due to the inverse piezoelectric effect. Thus the piezoelectric driving part 1 is bent and displaced to the substrate (not shown). Conversely, when the first intermediate electrode 10 is lower in potential than the first upper electrode 8 and the first lower electrode 12, the first piezoelectric film 6 contracts and the second piezoelectric film 7 conversely expands due to the inverse piezoelectric effect. Thus the piezoelectric driving part 1 is bent and displaced in the opposite direction from the substrate (not shown).

On one end of the piezoelectric driving part 1, the second upper electrode 9, the second intermediate electrode 11, and the second lower electrode 13 are disposed which are electrically isolated from the first upper electrode 8, the first intermediate electrode 10, and the first lower electrode 12 via a slit 5. The second upper electrode 9, the second intermediate electrode 11, and the second lower electrode 13 are set in a floating state and no voltage is applied to the electrodes. In other words, the piezoelectric driving part 1, the first piezoelectric film 6, and the second piezoelectric film 7 are used in the same layer on the other end of the piezoelectric driving part 1. The electrode slit 5 is provided between the first upper electrode 8 and the second upper electrode 9, between the first intermediate electrode 10 and the second intermediate electrode 11, and between the first lower electrode 12 and the second lower electrode 13, and the electrodes are electrically isolated from each other. Hereinafter, the second upper electrode 9, the second intermediate electrode 11, the third lower electrode 13, the first piezoelectric film 6 disposed between the second upper electrode 9 and the second intermediate electrode 11, and the second piezoelectric film disposed between the second intermediate electrode 11 and the second lower electrode 13 will be collectively called a movable electrode 15. In other words, the movable electrode 15 is provided on one end of the piezoelectric driving part 1 via the electrode slit 5 made up of the first piezoelectric film 6 and the second piezoelectric film 7.

Further, the movable electrode 15 is not provided on the other end of the piezoelectric driving part 1 and the other end is fixed on the substrate (not shown) via an anchor 16.

The fixed electrodes 3a and 3b covered with the dielectric films 2 are provided on the substrate (not shown) so as to face the movable electrode 15. The total height of the dielectric films 2 and the fixed electrodes 3a and 3b is set smaller than the height of the anchor 16 such that a gap (space) is formed between the movable electrode 15 and the dielectric films 2.

The movable electrode 15 provided on one end of the piezoelectric driving part 1 is vertically displaced according to a displacement of the piezoelectric driving part 1. When the movable electrode 15 is vertically displaced, a distance between the movable electrode 15 and the fixed electrodes 3a and 3b is changed. Thus a capacitance between the movable electrode 15 and the fixed electrodes 3a and 3b changes inversely with the distance. With this configuration, a variable capacitor (varicap) 20 is formed. A distance between the second lower electrode 13 making up the variable capacitor 20 and the fixed electrodes 3a and 3b disposed below the second lower electrode 13 depends upon voltages applied to the first upper electrode 8, the first intermediate electrode 10, and the first lower electrode 12.

To be specific, a capacitance C between the second lower electrode 13 and the fixed electrodes 3a and 3b is expressed by Formula (1).

$$C = \frac{\varepsilon_0 \varepsilon_{ox} S}{d_{ox} + \varepsilon_{ox} d_{air}} \quad (1)$$

where "$\varepsilon_0$" represents the permittivity of a vacuum ($8.854 \times 10^{-12}$ [F/m]), "$\varepsilon_{ox}$" represents the relative permittivity of the dielectric film 2, "S" represents the overlapping area of the fixed electrodes 3a and 3b and the second lower electrode 13, "$d_{ox}$" represents the thickness of the dielectric films 2, and "$d_{air}$" represents the gap between the surface of the dielectric film 2 and the surface of the second lower electrode 13.

For example, on the assumption that a signal inputted to the fixed electrode 3a passes through the variable capacitor 20 and is outputted to the other fixed electrode 3b, a capacitance between the fixed electrodes 3a and 3b is C/2, given that two capacitors have equal overlapping areas. The capacitance is changed by vertically operating an application portion 10b. For example, when the gap "$d_{air}$" decreases, the capacitance increases. Conversely, when the gap "$d_{air}$" increases, the capacitance decreases. Thus it is possible to operate the variable capacitor 20 as a capacitive switch and a varicap.

The fixed electrode 3a and the fixed electrode 3b are both opposed to the second lower electrode 13 via the dielectric films 2. This configuration is equivalent to a parallel connection of the two variable capacitors 20. For example, on the assumption that a signal inputted to the fixed electrode 3a passes through the variable capacitor 20 and is outputted to the other fixed electrode 3b, a capacitance between the fixed electrodes 3a and 3b is C/2, given that the two capacitors have equal overlapping areas (capacitance C). This capacitance changes when the piezoelectric driving part 1 vertically drives the second lower electrode 13 and the size of the gap changes.

The control circuit 4 is a semiconductor integrated circuit which is provided on the anchor 16 on the substrate (not shown) and formed by, for example, a CMOS process. This semiconductor integrated circuit is mainly made up of an analog circuit.

Figure 2:
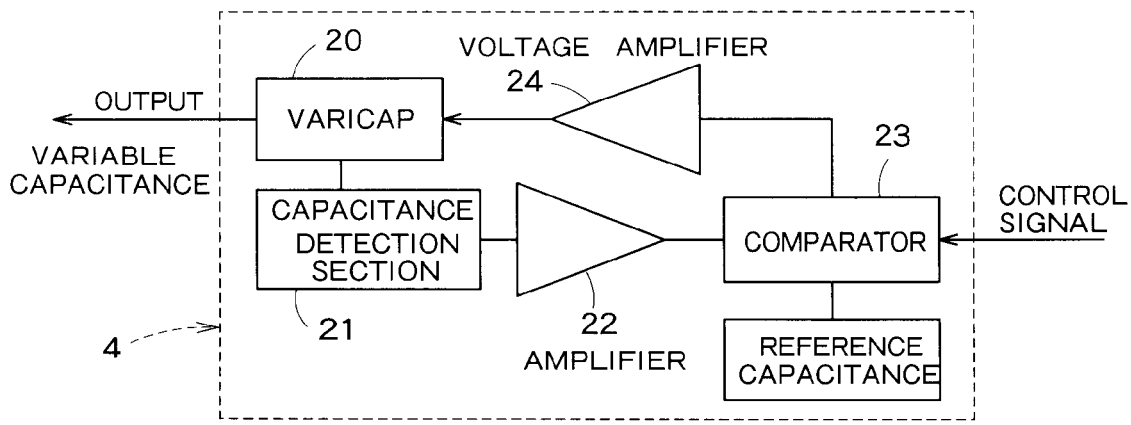
FIG. 2 is a block diagram showing an example of the internal configuration of a control circuit 4.

FIG. 2 is a block diagram showing an example of the internal configuration of the control circuit 4. The control circuit 4 of FIG. 2 includes a capacitance detection unit 21 for detecting the capacitance C of the variable capacitor 20 described above, an amplifier 22 for generating a signal corresponding to the detected capacitance C, a comparator 23 for comparing the output signal of the amplifier 22 with a reference capacitance (reference C value) and generating a signal corresponding to a capacitance difference, and a voltage amplifier (control voltage adjusting unit) 24 for amplifying the output signal of the comparator 23 to generate a control signal of the piezoelectric driving part 1.

The second lower electrode 13 and the fixed electrodes 3a and 3b which make up the electrode of the variable capacitor 20 are connected to the capacitance detection unit 21 in the control circuit 4 via a wiring pattern or connecting wires (not shown in FIG. 1). Thus the capacitance detection unit 21 can detect the capacitance of the variable capacitor 20.

Actually, the capacitance detection unit 21 does not directly measure the capacitance of the variable capacitor 20 but detects a signal corresponding to the capacitance. The signal is amplified by the amplifier 22 and then inputted to the comparator 23.

The comparator 23 compares the capacitance of the variable capacitor 20 with the predetermined reference capacitance and outputs a signal corresponding to a capacitance difference. The output signal of the comparator 23 is inputted to the voltage amplifier 24. The voltage amplifier 24 generates voltages to be applied to the first upper electrode 8, the first intermediate electrode 10, and the first lower electrode 12 according to the capacitance difference detected by the comparator 23. Thus voltages to be applied to the first upper electrode 8, the first intermediate electrode 10, and the first lower electrode 12 are controlled. Further, the first upper electrode 8, the first intermediate electrode 10, and the first lower electrode 12 are connected to, for example, a voltage controller (not shown) for controlling the voltages of the electrodes. The first intermediate electrode 10 may be set at a ground voltage and the voltage controller may be connected to the first upper electrode 8 and the first lower electrode 12.

With this operation, the control circuit 4 of FIG. 2 detects a change in the capacitance of the variable capacitor 20 and performs feedback control such that the variable capacitor 20 has a predetermined value. When the capacitance of the variable capacitor 20 is changed, the reference capacitance of the comparator 23 is changed according to a desired capacitance.

As described above, in the present embodiment, the capacitance of the variable capacitor 20 provided on the other end of the piezoelectric driving part 1 is detected by the control circuit 4 and voltages to be applied to the first and second piezoelectric films 6 and 7 are feedback controlled such that the variable capacitor 20 has a constant capacitance. Thus it is possible to reduce variations in the change of the capacitance of the variable capacitor 20, achieving manufacturing yields exceeding about 95%. Further, the piezoelectric driving part 1 and the control circuit 4 can be formed by a semiconductor process on the anchor 16 for fixing the piezoelectric driving part 1, thereby reducing the size of the variable capacitance device.

Second Embodiment

Second Embodiment is different from First Embodiment in the internal configuration of a control circuit 4. The other configurations are similar to those of First Embodiment and thus the explanation thereof is omitted.

Figure 3:
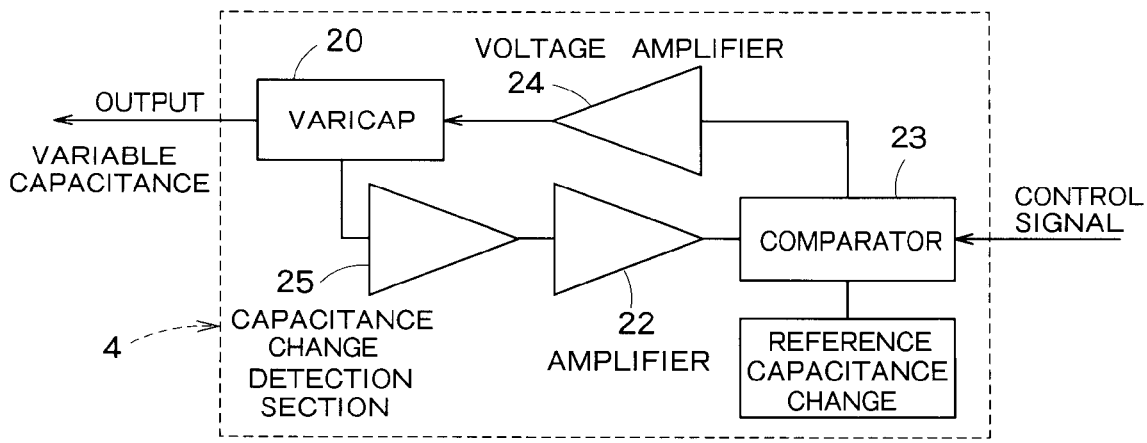
FIG. 3 is a block diagram showing the internal configuration of a control circuit 4 according to Second Embodiment.

FIG. 3 is a block diagram showing the internal configuration of the control circuit 4 according to Second Embodiment. The control circuit 4 of FIG. 3 includes, instead of the capacitance detection unit 21 of FIG. 1, a capacitance change detection unit 25 for detecting a change in the capacitance of a variable capacitor 20 per unit time.

The capacitance change detection unit 25 detects a change in capacitance by obtaining a difference between the capacitance of the variable capacitor 20 at a certain time and a capacitance after the unit time. In order to eliminate an error and variations, a final change in capacitance may be detected by averaging results obtained by repeatedly detecting a change in capacitance.

The detected difference in capacitance is amplified by an amplifier 22 and then inputted to a comparator 23. The comparator 23 compares the detected difference in capacitance with a predetermined reference difference in capacitance and outputs a differential signal of the detected difference in capacitance and the reference difference in capacitance. The differential signal is amplified by a voltage amplifier 24.

Based on the differential signal, the voltage amplifier 24 controls voltages applied to a first upper electrode 8, a first intermediate electrode 10, and a first lower electrode 12 so as to offset the change in the capacitance of the variable capacitor 20. To be specific, when the change in capacitance is larger than the reference difference in capacitance, the voltage amplifier 24 decides that the change in capacitance is large and performs control so as to offset the change in the capacitance of the variable capacitor 20. The control for offsetting the change in the capacitance of the variable capacitor 20 is, for example, control for changing a distance between the first lower electrode 12 and fixed electrodes 3a and 3b in a temporary or continuous manner. Thus even when a piezoelectric driving part 1 undergoes hard acceleration and the capacitance of the variable capacitor 20 is rapidly changed, it is possible to perform control so as to offset the change in capacitance. When the change in capacitance is equal to or smaller than the reference difference in capacitance, the control for offsetting the change in capacitance is not performed.

Alternatively, the comparator 23 of FIG. 3 may be omitted and control may be performed so as to offset the change in capacitance regardless of whether the change in capacitance detected by the capacitance change detection unit 25 is large or small.

As described above, in Embodiment 2, the change in the capacitance of the variable capacitor 20 is detected and control is performed so as to drive the piezoelectric driving part 1 in a direction that offsets the change in capacitance. Thus even in the event of an unexpected acceleration, it is possible to suppress fluctuations in the capacitance of the variable capacitor 20, thereby expanding the range of application of the variable capacitor 20 according to the present embodiment.

Third Embodiment

Third Embodiment is identical to Second Embodiment in hardware configuration but different from Second Embodiment in the operation of a control circuit 4.

When the variable capacitance device of FIG. 1 is installed in electronic equipment such as a portable phone, the user may unintentionally drop the electronic equipment to the ground, hit the electronic equipment to something, or shake the electronic equipment, so that the variable capacitance device may temporarily undergo high acceleration. When the acceleration is not so large, the acceleration can be handled by control for offsetting the change in capacitance according to the technique of Second Embodiment. When the acceleration is too large to be offset, it is desirable to perform control so as to prevent a piezoelectric driving part 1 from being broken in the variable capacitance device.

Thus in the present embodiment, when a detected difference in capacitance is larger than a reference difference in capacitance, an escaping operation is performed to prevent the piezoelectric driving part 1 from being broken.

Whether a detected difference in capacitance is larger or smaller than the reference difference in capacitance can be detected based on a differential signal outputted from a comparator 23. When the detected difference in capacitance is larger than the reference difference in capacitance, the piezoelectric driving part 1 undergoes high acceleration. Therefore, a voltage amplifier 24 performs an escaping operation of some kind in order to prevent the piezoelectric driving part 1 from being broken. In a specific example of the escaping operation, in order to prevent a second lower electrode 13 of a movable electrode 15 provided on one end of the piezoelectric driving part 1 from being brought into contact with dielectric films 2 disposed below the second lower electrode 13, the voltages of a first upper electrode 8, a first intermediate electrode 10, and first lower electrode 12 are controlled and a distance between the other end of the piezoelectric driving part 1 and the dielectric films 2 is increased. Thus even when the piezoelectric driving part 1 undergoes high acceleration, the movable electrode 15 is not brought into contact with the dielectric films 2.

In this way, in Third Embodiment, the piezoelectric driving part 1 is caused to escape to a safe place when the piezoelectric driving part 1 undergoes hard acceleration. It is thus possible to prevent the piezoelectric driving part 1 from being broken, improving the reliability of the variable capacitance device.

Fourth Embodiment

In the examples described in Second and Third Embodiments, the capacitance of the variable capacitor 20 and a change in the capacitance of the variable capacitor 20 are detected. Voltages applied to first and second piezoelectric films 6 and 7 and a change in voltage may be detected.

Generally, when a piezoelectric film undergoes acceleration, a voltage between both sides of the film changes with the magnitude of the acceleration. To be specific, a pulse voltage is generated according to the magnitude of acceleration between both sides (an first upper electrode 8 and a first intermediate electrode 10 are provided on the sides of the first piezoelectric film 6, and the first intermediate electrode 10 and a first lower electrode 12 are provided on the sides of the second piezoelectric film 7) of each of the first and second piezoelectric films 6 and 7. Therefore, by detecting voltages between both sides of the piezoelectric films 6 and 7, the accelerations of the piezoelectric films 6 and 7 can be detected.

Figure 4:
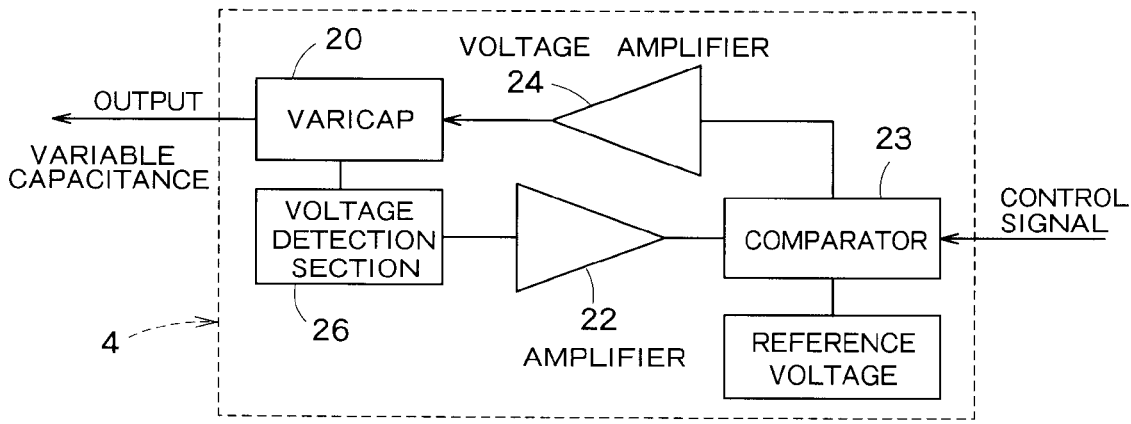
FIG. 4 is a block diagram showing the internal configuration of a control circuit 4 according to Fourth Embodiment.

FIG. 4 is a block diagram showing the internal configuration of a control circuit 4 according to Fourth Embodiment. The control circuit 4 of FIG. 4 includes a voltage detection unit 26 instead of the capacitance detection unit 21 of FIG. 2. The voltage detection unit 26 detects a voltage between the first upper electrode 8 and the first intermediate electrode 10 and a voltage between the first lower electrode 12 and the first intermediate electrode 10. A voltage is originally applied between these electrodes. In the event of acceleration, a pulse voltage is superimposed according to the magnitude of the acceleration. Thus, the voltage detection unit 26 detects the pulse voltage.

The first upper electrode 8, the first intermediate electrode 10, and the first lower electrode 12 are connected to the voltage detection unit 26 in the control circuit 4 via a wiring pattern or connecting wires (not shown in FIG. 1).

The voltage detection unit 26 does not output a voltage between the first upper electrode 8 and the first intermediate electrode 10 and a voltage between the first lower electrode 12 and the first intermediate electrode 10 as they are but outputs a signal corresponding to the voltage. The signal is amplified by an amplifier 22 and then inputted to a comparator 23.

The comparator 23 compares the detected voltage with a predetermined reference voltage and outputs a voltage difference signal. This signal is inputted to a voltage amplifier 24. The voltage amplifier 24 controls voltages applied to the first upper electrode 8, the first intermediate electrode 10, and the first lower electrode 12 such that the voltage detected by the voltage detection unit 26 is reduced, that is, the acceleration of a piezoelectric driving part 1 is offset.

As described above, in Fourth Embodiment, the acceleration of the piezoelectric driving part 1 is detected by detecting voltages applied to the first and second piezoelectric films 6 and 7, and the voltages applied to the electrodes is controlled so as to offset the acceleration. Thus as in Second Embodiment, even when the piezoelectric driving part 1 undergoes acceleration, it is possible to suppress a change in the capacitance of a variable capacitor 20.

Instead of the voltage detection unit 26 of FIG. 4, a voltage change detection unit may be provided to detect a change in voltage between the first upper electrode 8 and the first intermediate electrode 10 and a change in voltage between the first lower electrode 12 and the first intermediate electrode 10, and the voltages of the electrodes may be controlled so as to offset the detected difference in voltage. Alternatively, when a change in voltage is large, the escaping operation of the piezoelectric driving part 1 shown in Third Embodiment may be performed.

Fifth Embodiment

In Fifth Embodiment, an acceleration sensor is provided separately from a piezoelectric driving part 1 making up a variable capacitor 20.

Figure 5:
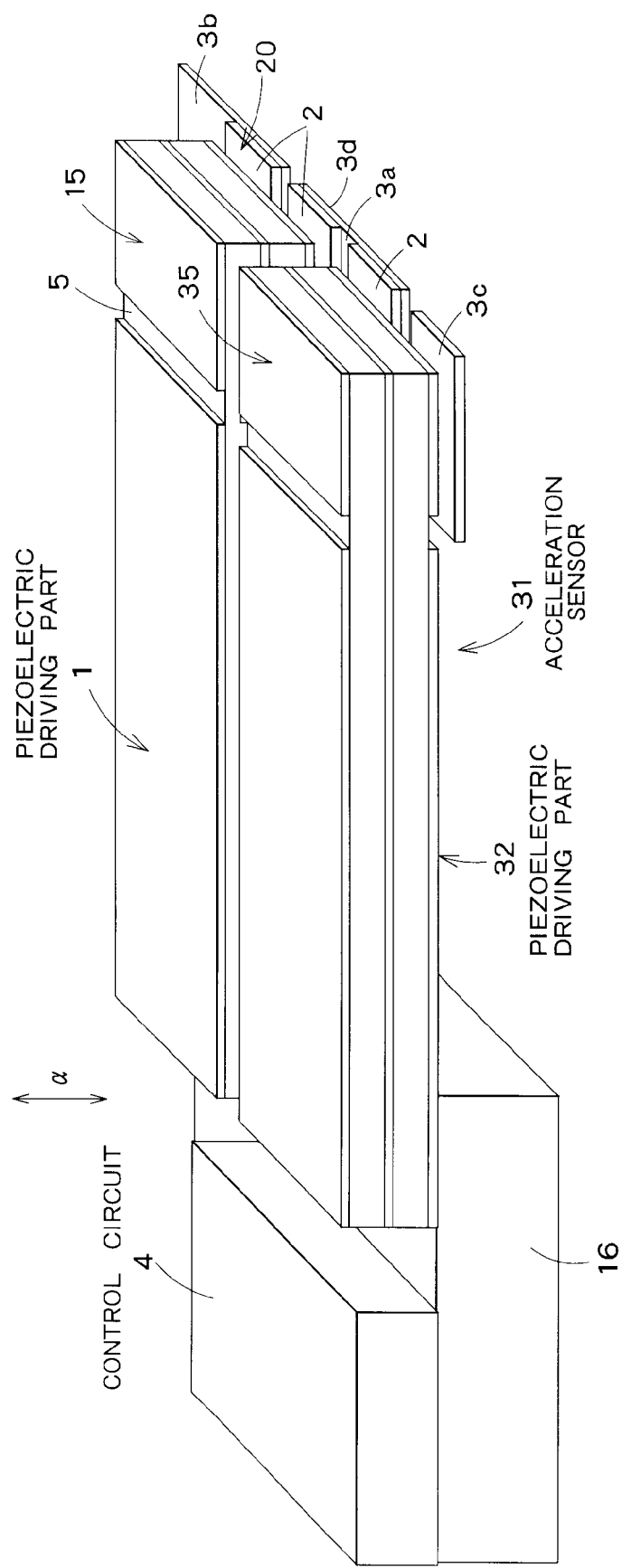
FIG. 5 shows the overall structure of a variable capacitance device according to Fifth Embodiment of the present invention.

FIG. 5 shows the overall structure of a variable capacitance device according to Fifth Embodiment of the present invention. The variable capacitance device of FIG. 5 includes an acceleration sensor 31 in addition to the structure of FIG. 1. The acceleration sensor 31 includes a piezoelectric driving part 32 which has the same configuration as the piezoelectric driving part 1 and a movable electrode 35 which is disposed on one end of the piezoelectric driving part 32 and has the same configuration as a movable electrode 15. Fixed electrodes 3c and 3d are disposed on a substrate (not shown) so as to be opposed to the movable electrode 35 with dielectric films 2 interposed between the acceleration sensor 31 and the fixed electrodes 3c and 3d.

Like the piezoelectric driving part 1, the other end of the piezoelectric driving part 32 does not include the movable electrode 35 and is fixed on the substrate (not shown) via an anchor 16.

The layout of the electrodes of the piezoelectric driving part 32 is also similar to that of the piezoelectric driving part 1. The electrodes of the piezoelectric driving part 32 are controlled by a control circuit 4 as in the piezoelectric driving part 1.

On the movable electrode 35 provided on one end of the piezoelectric driving part 32, a variable capacitor 20 is formed as in the piezoelectric driving part 1. The capacitance of the variable capacitor 20 is used for detecting acceleration and is not used as the capacitance of the variable capacitor 20.

The acceleration sensor 31 detects acceleration by using the same techniques as Second to Fourth Embodiments. The newly provided acceleration sensor 31 can detect an acceleration in a vertical direction with respect to a surface of the semiconductor substrate (not shown), that is, a vertical acceleration (the direction of arrow α of FIG. 5, hereinafter, will be referred to as the Y-axis direction).

Figure 6:
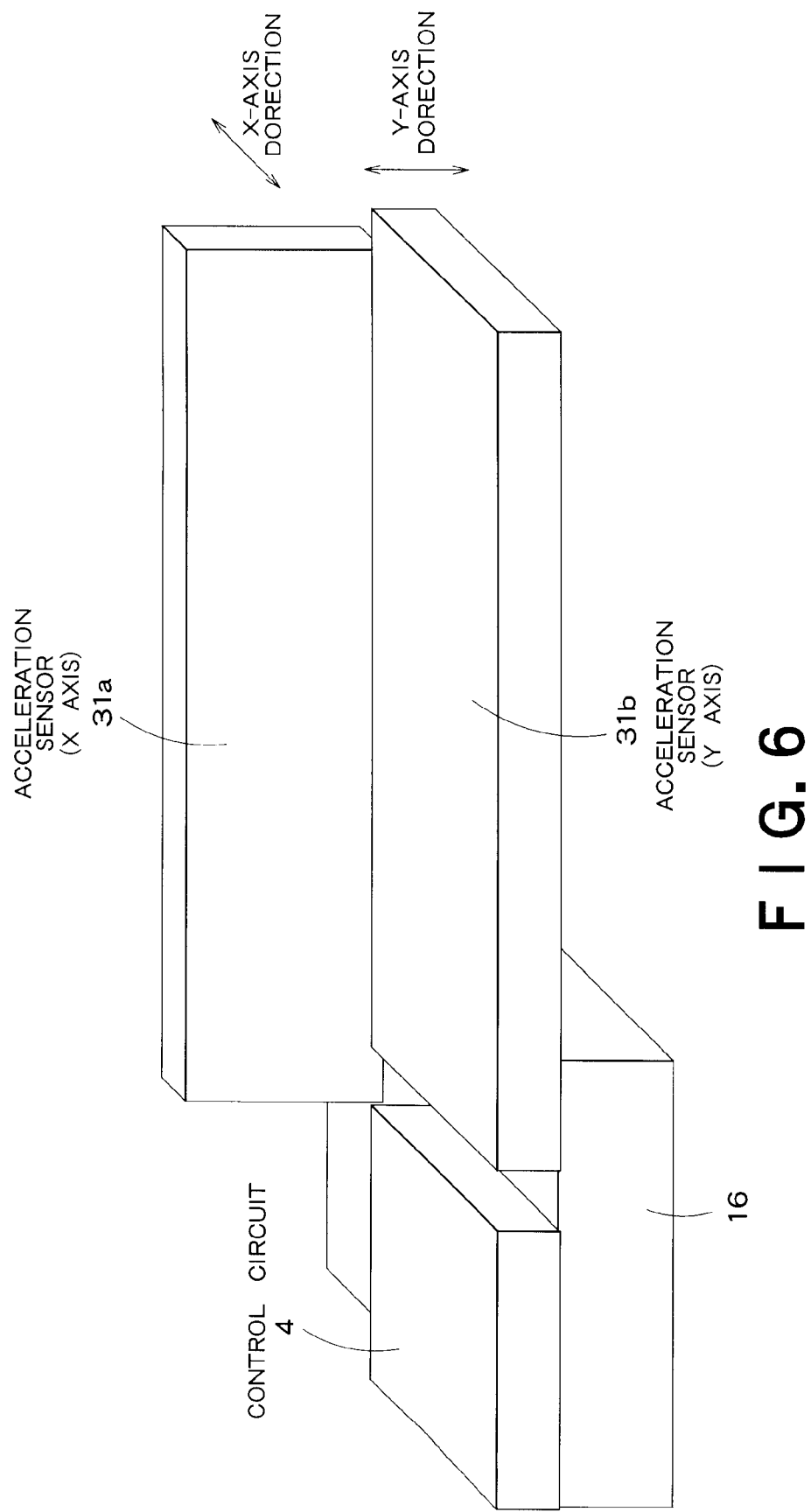
FIG. 6 shows an example of a variable capacitance device capable of detecting accelerations in two axial directions.

In order to detect accelerations of two or more axes, structures identical to the acceleration sensor 31 of FIG. 5 are disposed along the respective axes. For example, FIG. 6 shows an example of a variable capacitance device capable of detecting accelerations in two axial directions. For simplicity, the piezoelectric driving part 1 making up the variable capacitor 20 is omitted in FIG. 6. An acceleration sensor 31a of FIG. 6 detects an acceleration in a direction perpendicular to the Y-axis direction, that is, a direction in parallel with a surface of the semiconductor substrate (not shown) (hereinafter, will be referred to as the X-axis direction), and an acceleration sensor 31b detects an acceleration in the Y-axis direction. The variable capacitor 20 and the acceleration sensor 31 have, for example, the same sizes and the same shapes and are formed so as to be adjacent to each other in the same direction on the same substrate.

As described above, in Fifth Embodiment, the acceleration sensor 31 having the same structure as the variable capacitor 20 is provided separately from the variable capacitor 20. Thus, it is possible to accurately detect the acceleration of the variable capacitor 20 and take measures including an escaping operation for the variable capacitor 20 in the event of hard acceleration, thereby improving the reliability of the variable capacitor 20. Further, the acceleration sensors 31a and 31b disposed in two or more directions make it possible to detect accelerations in two or more directions.

Embodiment of a Portable Phone Using Any One of First to Fifth Embodiments

In Sixth Embodiment, the variable capacitance device described in any one of First to Fifth Embodiments is provided in a portable phone.

Figure 7:
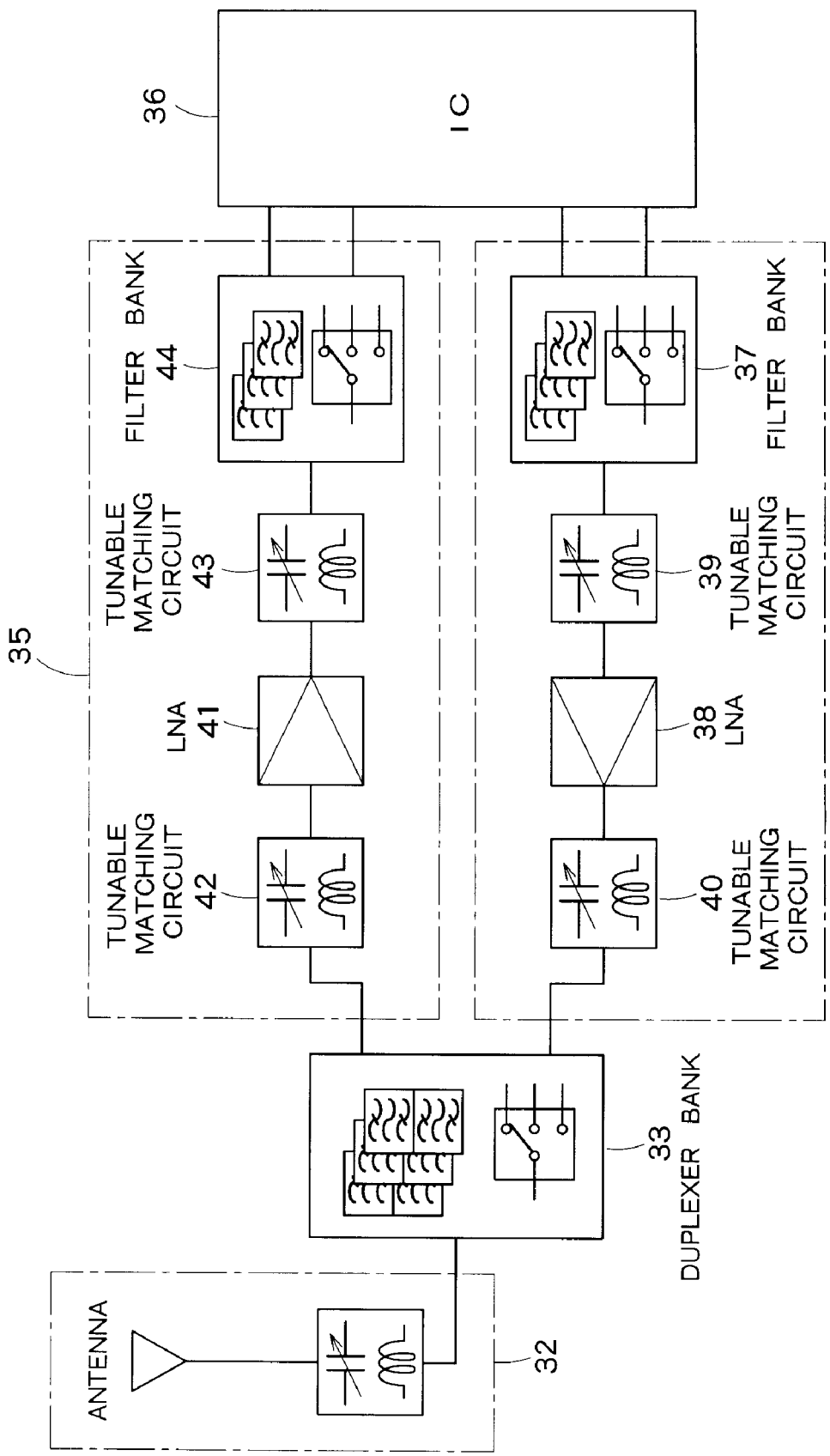
FIG. 7 is a block diagram showing the internal configuration of a front end unit of a portable phone according to the present invention.

FIG. 7 is a block diagram showing, according to a portable phone of the present invention, the internal configuration of a front end of the portable phone. The portable phone of FIG. 7 includes a tunable antenna 32 capable of switching frequency bands, a duplexer bank 33 for switching transmission and reception, a transmission unit 34, a reception unit 35, and a baseband processing IC 36.

The transmission unit 34 includes a filter bank 37 for selecting frequencies, a power amplifier 38 for performing high frequency amplification, and tunable matching circuits 39 and 40 provided in the previous and subsequent stages of the power amplifier 38. The reception unit 35 includes an LNA 41 for performing high frequency amplification, tunable matching circuits 42 and 43 provided in the previous and subsequent stages of the LNA 41, and a filter bank 44 for selecting frequencies.

The variable capacitance device described in any one of First to Fifth Embodiments is used in the tunable antenna 32 and the tunable matching circuits 39, 40, 42 and 43 which are provided in the portable phone of FIG. 7.

The variable capacitance device described above achieves low power consumption, has a capacitance hardly fluctuating in the event of disturbance, can perform an escaping operation according to acceleration, and can be formed on a substrate by using a semiconductor process. Thus the front end unit of the portable phone can be miniaturized and low power consumption can be achieved.

Variation of First Embodiment

First to Fifth Embodiments described above and the embodiment of the portable phone using any one of First to Fifth Embodiments were described by using the example in which the piezoelectric driving part 1 includes the first piezoelectric film 6, the second piezoelectric film 7 disposed below the first piezoelectric film 6, the first upper electrode 8 disposed on the top surface of the first piezoelectric film 6, the intermediate electrode 10 disposed between the undersurface of the first piezoelectric film 6 and the top surface of the second piezoelectric film 7, and the lower electrode 12 disposed on the undersurface of the second piezoelectric film 7. With the configuration including the plurality of piezoelectric films and electrodes thus, it is possible to control voltages applied to the respective electrodes of the plurality of layers, thereby controlling upper and lower bending displacements with high accuracy.

Figure 8:
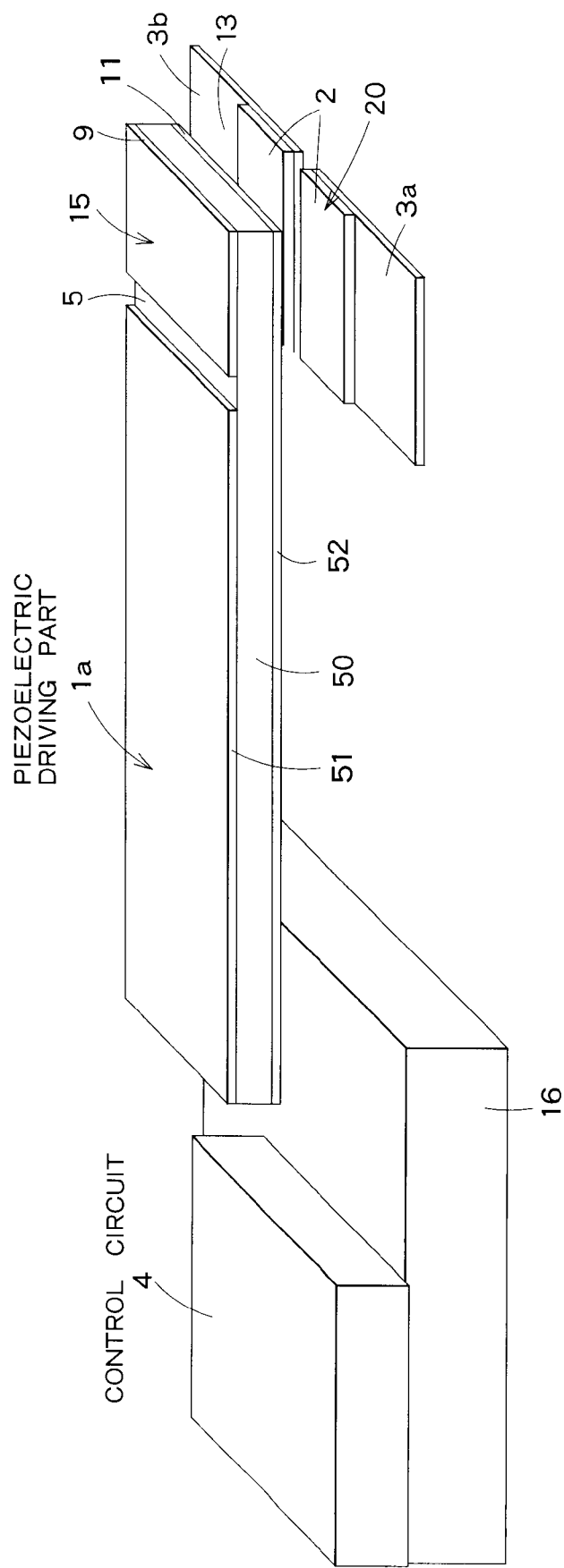
FIG. 8 shows the overall structure of a variable capacitance device according to a variation of First Embodiment of the present invention.

However, First to Fifth Embodiments each include the control circuit 4 for suppressing a change in the capacitance of the variable capacitance device formed between the movable electrode and the fixed electrode. Thus unlike the foregoing embodiments, it is not always necessary to provide the piezoelectric films and electrodes of two or more layers in the piezoelectric driving part 1. For example, as shown in FIG. 8, a piezoelectric driving part 1a of a single layer of piezoelectric film may be provided. To be specific, the piezoelectric driving part 1a includes only a piezoelectric film 50, a first upper electrode 51 disposed on the top surface of the piezoelectric film 50, and a first lower electrode 52 disposed on the undersurface of the piezoelectric film 50. This configuration makes it possible to reduce the manufacturing cost of the variable capacitance device.

Actually, it is needless to say that the piezoelectric driving part 1 including the piezoelectric films and electrodes of two or more layers can achieve higher accuracy.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A variable capacitance device, comprising:
a piezoelectric driving part which has a piezoelectric film, an upper electrode disposed on a top surface of the piezoelectric film, a lower electrode disposed on an undersurface of the piezoelectric film and electrode slits which separate the upper electrode and the lower electrode into two, respectively;
a movable electrode provided via the electrode slits at one end of the piezoelectric driving part;
a fixed electrode disposed opposite to the movable electrode via a gap;

a dielectric film which is disposed opposite to the movable electrode via the gap and provided on the fixed electrode; and a driving control unit which adjusts a distance between the movable electrode and the fixed electrode to reduce a fluctuation of a predetermined capacitance of a variable capacitor formed between the variable electrode and the fixed electrode., wherein the driving control part includes:

a capacitance change detector which detects a change in the capacitance of the variable capacitor per unit time; and a control voltage adjusting part which adjusts a control voltage to be applied to the upper electrode and the lower electrode of the piezoelectric driving part to cancel out the change detected by the capacitance change detector, or which adjusts a control voltage to be applied to the upper electrode and the lower electrode of the piezoelectric driving part to prevent the movable electrode from contacting the dielectric film when the change detected by the capacitance change detector exceeds a predetermined value.

2. The variable capacitance device according to claim 1, wherein the piezoelectric film has a first piezoelectric film and a second piezoelectric film disposed below the first piezoelectric film;

the piezoelectric driving part has an intermediate electrode disposed between the undersurface of the first piezoelectric film and the top surface of the second piezoelectric film; and the movable electrode is formed via the electrode slits at one ends of the upper electrode, the lower electrode and the intermediate electrode.

3. The variable capacitance device according to claim 1, wherein the fixed electrode has a plurality of fixed electrode parts which are disposed separate from each other and disposed opposite to the movable electrode provided at one end of the piezoelectric driving part via the gap by sandwiching the dielectric film.

4. The variable capacitance device according to claim 1, wherein the piezoelectric driving part, the driving control part and the fixed electrode are formed on the same substrate.

5. A variable capacitance device, comprising:

a piezoelectric driving part which has a piezoelectric film, an upper electrode disposed on a top surface of the piezoelectric film, a lower electrode disposed on an undersurface of the piezoelectric film and electrode slits which separate the upper electrode and the lower electrode into two, respectively;

a movable electrode provided via the electrode slits at one end of the piezoelectric driving part;

a fixed electrode disposed opposite to the movable electrode via a gap;

a dielectric film which is disposed opposite to the movable electrode via the gap and provided on the fixed electrode; and a driving control unit which adjusts a distance between the movable electrode and the fixed electrode to reduce a fluctuation of a predetermined capacitance of a variable capacitor formed between the variable electrode and the fixed electrode, wherein the driving control part includes:

a voltage change detector which detects a change in the voltages of the upper electrode and the lower electrode of the piezoelectric driving part per unit time; and a control voltage adjusting part which adjusts a control voltage to be applied to the upper electrode and the lower electrode of the piezoelectric driving part to cancel out the change detected by the voltage change detector, or which adjusts a control voltage to be applied to the upper electrode and the lower electrode of the piezoelectric driving part to prevent the movable electrode from contacting the dielectric film when the change detected by the capacitance change detector exceeds a predetermined value.

6. A variable capacitance device, comprising:

a variable capacitor which variably changes a capacitance by expansion and contraction of a first piezoelectric film; and an acceleration sensor which is adjacently disposed to the variable capacitor, capable of changing a capacitance by expansion and contraction of a second piezoelectric film, and detects at least one of a change in the capacitance by expansion and contraction of the second piezoelectric film per unit time and a change in the voltages at both surface of the second piezoelectric film, wherein the variable capacitor has:

a first piezoelectric driving part which has a first upper electrode and a first lower electrode disposed up and down by sandwiching the first piezoelectric film, and has first electrode slits which separate the first upper electrode and the first lower electrode into two, respectively;

a first movable electrode provided via the first electrode slits at one end of the first piezoelectric driving part;

a first fixed electrode disposed opposite to the first movable electrode via a gap by sandwiching a dielectric film; and a first driving control part which adjusts a distance between the first movable electrode and the first fixed electrode to reduce a fluctuation of a predetermined capacitance of a variable capacitor formed between the first movable electrode and the first fixed electrode, wherein the acceleration sensor has:

a second piezoelectric driving part which has a second upper electrode and a second lower electrode disposed up and down by sandwiching the second piezoelectric film, and has second electrode slits which separate the second upper electrode and the second lower electrode into two, respectively;

a second movable electrode provided via the electrode slits at one end of the second piezoelectric driving part;

a second fixed electrode disposed opposite to the second movable electrode via a gap by sandwiching a dielectric film; and a second driving control part which adjusts a distance between the second movable electrode and the second fixed electrode to reduce a fluctuation of a predetermined capacitance of a variable capacitor formed between the second movable electrode and the second fixed electrode.

7. The variable capacitance device according to claim 6, wherein the accelerator has a plurality of accelerator sensor parts which detect the change in at least one of the capacitance and the voltage in directions different from each other per unit time.

8. The variable capacitance device according to claim 6, wherein the variable capacitor and the accelerator have the same size and the same shape, and formed adjacent to the same direction on the same substrate.

9. The variable capacitance device according to claim 6, wherein the first piezoelectric film has a third piezoelectric film and a fourth piezoelectric film disposed below the third piezoelectric film;

the first piezoelectric driving part has a first intermediate electrode disposed between an undersurface of the third piezoelectric film and a top surface of the fourth piezoelectric film; and the first movable electrode is formed via the first electrode slits at one ends of the first upper electrode, the first lower electrode and the first intermediate electrode;

wherein the second piezoelectric film has a fifth piezoelectric film and a sixth piezoelectric film disposed below the fifth piezoelectric film;

the second piezoelectric driving part has a second intermediate electrode disposed between an undersurface of the fifth piezoelectric film and a top surface of the sixth piezoelectric film; and the second movable electrode is formed via the second electrode slits at one ends of the second upper electrode, the second lower electrode and the second intermediate electrode.

10. A portable phone, comprising:

a tunable antenna which adjusts a frequency band of a radio frequency signal transmitted and received by an antenna;

a duplexer which switches transmission and reception directions;

a transmission processing unit which generates a transmission signal transmitted by the antenna via the duplexer;

a reception processing unit which is received by the antenna and extracts a predetermined frequency band component included in the reception signal passing through the duplexer; and a baseband processing unit which is connected to the transmission processing unit and the reception processing unit, and performs baseband process, wherein at least one of the tunable antenna, the transmission processing unit and the reception processing unit has a variable capacitance device, the capacitance device including:

a piezoelectric driving part which has a piezoelectric film, an upper electrode disposed on a top surface of the piezoelectric film, a lower electrode disposed on an undersurface of the piezoelectric film and electrode slits which separate the upper electrode and the lower electrode into two, respectively;

a movable electrode provided via the electrode slits at one end of the piezoelectric driving part;

a fixed electrode disposed opposite to the movable electrode via a gap;

a dielectric film which is disposed opposite to the movable electrode via the gap and provided on the fixed electrode; and a driving control unit which adjusts a distance between the movable electrode and the fixed electrode to reduce a fluctuation of a predetermined capacitance of a variable capacitor formed between the variable electrode and the fixed electrode, wherein the driving control part includes:

a capacitance change detector which detects a change in the capacitance of the variable capacitor per unit time; and a control voltage adjusting part which adjusts a control voltage to be applied to the upper electrode and the lower electrode of the piezoelectric driving part to cancel out the change detected by the capacitance change detector, or which adjusts a control voltage to be applied to the upper electrode and the lower electrode of the piezoelectric driving part to prevent the movable electrode from contacting the dielectric film when the change detected by the capacitance change detector exceeds a predetermined value.

11. The portable phone according to claim 10, wherein the piezoelectric film has a first piezoelectric film and a second piezoelectric film disposed below the first piezoelectric film;

the piezoelectric driving part has an intermediate electrode disposed between the undersurface of the first piezoelectric film and the top surface of the second piezoelectric film; and the movable electrode is formed via the electrode slits at one ends of the upper electrode, the lower electrode and the intermediate electrode.

12. A portable phone, comprising:

a tunable antenna which adjusts a frequency band of a radio frequency signal transmitted and received by an antenna;

a duplexer which switches transmission and reception directions;

a transmission processing unit which generates a transmission signal transmitted by the antenna via the duplexer;

a reception processing unit which is received by the antenna and extracts a predetermined frequency band component included in the reception signal passing through the duplexer; and a baseband processing unit which is connected to the transmission processing unit and the reception processing unit, and performs baseband process, wherein at least one of the tunable antenna, the transmission processing unit and the reception processing unit has a variable capacitance device, the capacitance device including:

a piezoelectric driving part which has a piezoelectric film, an upper electrode disposed on a top surface of the piezoelectric film, a lower electrode disposed on an undersurface of the piezoelectric film and electrode slits which separate the upper electrode and the lower electrode into two, respectively;

a movable electrode provided via the electrode slits at one end of the piezoelectric driving part;

a fixed electrode disposed opposite to the movable electrode via a gap;

a dielectric film which is disposed opposite to the movable electrode via the gap and provided on the fixed electrode; and a driving control unit which adjusts a distance between the movable electrode and the fixed electrode to reduce a fluctuation of a predetermined capacitance of a variable capacitor formed between the variable electrode and the fixed electrode, wherein the driving control part includes:

a voltage change detector which detects a change in the voltages of the upper electrode and the lower electrode of the piezoelectric driving part per unit time; and a control voltage adjusting part which adjusts a control voltage to be applied to the upper electrode and the lower electrode of the piezoelectric driving part to cancel out the change detected by the voltage change detector, or which adjusts a control voltage to be applied to the upper electrode and the lower electrode of the piezoelectric driving part to prevent the movable electrode from contacting the dielectric film when the change detected by the capacitance change detector exceeds a predetermined value.

* * * * *